July 18, 1939. H. G. LOMBARD 2,166,916
CLIP FOR MOUNTING CABLES AND LIKE OBJECTS
Filed May 25, 1937
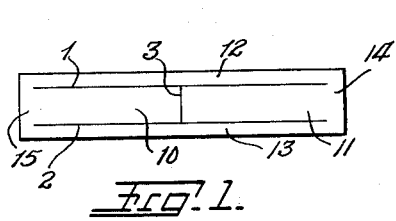
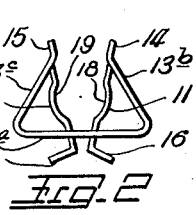
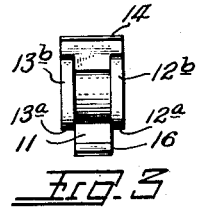
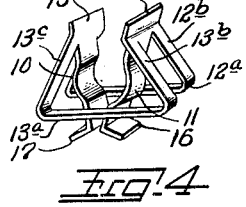
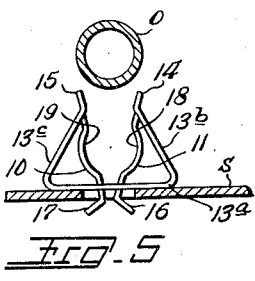
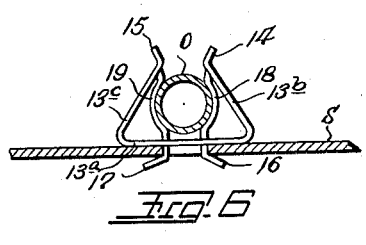
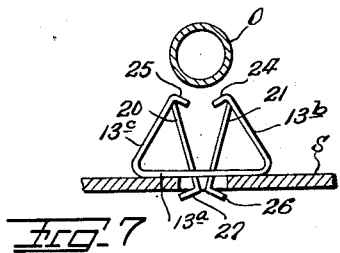
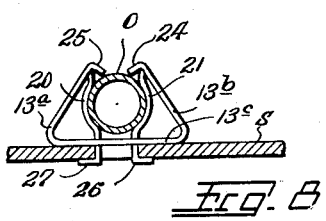
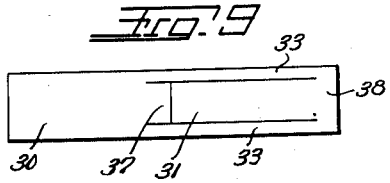
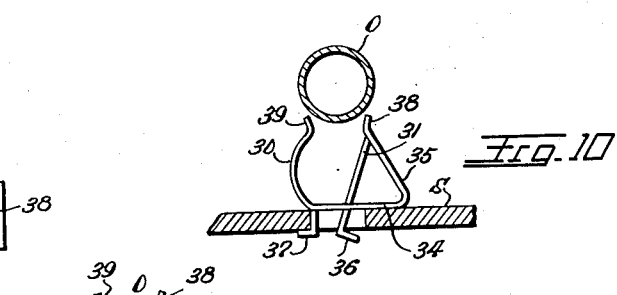
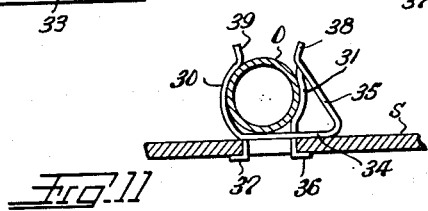
Inventor
H. G. Lombard
Attorney Patented July 18, 1939

2,166,916

UNITED STATES PATENT OFFICE 2,166,916

CLIP FOR MOUNTING CABLES AND LIKE OBJECTS

Herman G. Lombard, Washington, D. C., assignor to Albert H. Tinnerman, Cleveland, Ohio Application May 25, 1937, Serial No. 144,742

1 Claim. (Cl. 24—73)

This invention relates to means for mounting cables, conduits, electrical conductors, tube lines, rods, posts, and like objects in place upon a support.

More particularly, the invention is directed to spring clip devices constructed from a minimum of relatively thin material of sheet or strip form, such as sheet spring steel, sheet metal, cold rolled metal, flattened wire, etc., and designed for use in combination with conduits, cables and like objects for rigidly mounting the same in applied position on a support without danger of loosening or becoming accidentally removed incident to vibration, jarring and strain which may take place in the supporting member.

A specific illustration of the use to which the clip devices of this invention may be put is the mounting of the gas lines, conduits and cables employed on automobiles. In mounting such objects, it is essential that the clips be capable of being easily and quickly applied and have a firm, rigid engagement in applied position on the chassis or frame in order to withstand vibration, jarring and strain incident to use of the automobile. If as a result of such vibration or the like, slippage occurs to such extent that the object is loose in its mounting, dangerous wear and offensive noises will result.

At the present time devices employed for mounting tube lines, and the like, are bulky and cumbersome and also are unnecessarily expensive in manufacture due to the amount of material required in their construction. Some arrangements embody a well known form of clamp consisting of a section of sheet metal disposed around the tube or other object and provided with an apertured projecting end seating on the support and secured by a separate bolt fastening passing through an aperture in the support and engaging with the projecting end of the clamp. Other constructions for mounting cables and like objects embody securing devices comprising clips provided with shanks having a substantial snap stud engagement in apertures provided in the frame. This form of device consists of cooperating shank legs which are relatively yieldable to engage in the aperture in a friction or press fit. Such a friction, press fit has been found hardly effective to maintain a clip in applied position over any extended period of time under conditions of continuous, hard usage such as, for example, takes place in an automobile frame and chassis.

In any event, the support, frame or other chassis part must be provided with an aperture to receive the shank of a bolt or clip. The clip devices herein proposed do not in any way complicate the supporting structure now in use since all that is necessary is a simple aperture to receive the leg members comprising the shank of the clip while at the same time a less expensive, more durable and easily and quickly installed clip mounting for an object is provided.

This invention therefore contemplates the provision of inexpensive clip devices which may be constructed from a relatively small section of substantially flat metal, such as sheet metal, spring steel, cold rolled metal, and the like, by a minimum of die operations and without loss or waste of material whatsoever.

Another object of the invention is to provide a means for mounting cables, and the like, embodying clip devices having shanks comprising relatively yieldable holding elements readily inserted into an aperture in a support and adapted to be moved to tensioned locking relation upon application thereto of the object to be mounted.

A further object aims to provide a clip means by which a tube line or like object, can be easily and quickly mounted on a support and which will hold the object rigidly in applied position in spaced relation to the adjacent surface of the support to prevent dangerous wear and objectionable noises.

A still further object is the provision in such a clip for mounting tube lines or the like, of body portions carrying yieldable holding elements, the said body portions serving to seat the clip in applied position on the support and the yieldable holding elements being adapted to lock clip in such applied position.

A more specific object is to so shape and proportion the clip as to provide locking means for use with the holding elements such that a cable or other object applied thereto is locked in applied position in the clip and relative to the support.

Further objects and advantages of the invention will be apparent to those skilled in the art as a description thereof proceeds with reference to the accompanying drawing in which like reference characters designate like parts throughout the same, and in which:

Fig. 1 represents a blank from which a preferred form of the improved clip device may be constructed;

Fig. 2 is an edge elevation of the improved clip device which may be constructed from the blank represented in Fig. 1;

Fig. 3 is an end view of Fig. 2;

Fig. 4 is a perspective of the clip device shown in Figs. 2 and 3;

Fig. 5 shows the clip device in position on a support preparatory to the application thereto of a cable or other object to be mounted;

Fig. 6 shows the clip device in applied position on a support and mounting a cable or the like;

Fig. 7 shows a modification of the clip wherein the extremities of the body portions are designed to provide a locked mounting of an object in applied position;

Fig. 8 shows the clip device of Fig. 7 as employed for mounting an object in locked relation on a support;

Fig. 9 represents a blank from which a modified form of the clip may be constructed;

Fig. 10 shows the modified form of clip which may be constructed from the blank represented in Fig. 9; and, Fig. 11 shows the device of Fig. 10 as applied to position on a support and mounting an object.

In carrying out the invention, the securing devices for mounting a cable or tubing such as a gasoline line or wire conduit, comprise essentially a form of clip which may be constructed from a relatively small strip section or stamped blank of metal sheet material such as spring steel, cold rolled metal, sheet metal and the like. The section or blank is suitably formed to provide a substantial spring clip device bent generally in the form of a U-shape comprising spaced, oppositely disposed body portions connected at one end by substantially flat base portions. In the preferred form, each of the body portions is provided with or carries leg members having somewhat similar formations which together serve as holding elements for gripping the object to be mounted. The leg members of the clip are so designed as to extend below the base portion such that the extremities may be suitably formed to provide substantial hook elements, which, when applied into an opening in a support, function to support the clip in operative position thereon. In this relation, upon application of the object to be mounted, the leg members of a clip so applied to the support are effective as holding elements for mounting the object, and the hook elements, being the extremities of the leg members, are naturally forced apart to maintain the clip in locked relation in the opening in the support; thus an installation is provided in which the object mounted is securely held in the clip and the clip is rigidly and permanently retained on the support.

Referring to the drawing, Figs. 1–6 inclusive show a preferred form of the clip device which may be constructed from a blank or strip section of substantially flat metal sheet material, such as represented in Fig. 1. The section is suitably slit within its periphery along lines 1, 2 and 3 thus providing free leg members 10, 11 and body portions 12, 13, such leg members being integral with the extremities 14, 15 of the body portions. On being thus slit, the section is suitably fashioned to the desired form of generally U-shaped construction whereby the body portions 12, 13, Fig. 1, provide substantial loops or yokes carrying the free leg members 10, 11 between them in normally untensioned relation. See Fig. 4. The loops body portions or yokes may be of any suitable outline but preferably comprise substantially flat base sections 12a, 13a and opposed spring arms 12b, 12c and 13b, 13c, Figs. 2 and 3. The base sections naturally are elongated to insure that sufficient material be available to provide the necessary length in the leg members 10, 11 such that the extremities thereof may project below the base sections and provide a shank comprising hook elements 16, 17. As shown in Figs. 2, 5 and 6, the leg members 10, 11 serving as the means for holding an object, may be shaped to provide depressions 18, 19 providing embracing portions into which an object may snugly seat to be effectively gripped and retained in applied position. To facilitate the application of an object to the holding elements or leg members 10, 11 of a clip, the extremities 14, 15 of the body portions are outwardly flared whereby an object may readily be applied thereto and, under continued pressure, be easily and quickly advanced to desired position between the leg members in the area of the embracing portions 18, 19.

To secure an object such as a cable, tube, or the like, the necessary number of holes are provided in the support in the positions in which it is desired that the object shall extend when mounted. A clip device is then applied to each hole with the hook elements 16, 17 serving to retain the device in applied position on the support S, preparatory to the application thereto of the object to be mounted. Inasmuch as the leg members 10, 11 extend free from their points of suspension from the body portions or yokes 12, 13, they are relatively yieldable and may be readily compressed toward each other, if necessary, such that the hooks 16, 17 may pass through the hole in the support to position the clip with the base sections 12a, 13a, seated flush with the adjacent surface thereof as shown in Fig. 5. Upon release of pressure, the leg members 10, 11 naturally tend to assume their normal, untensioned relation whereupon the hooks 16, 17 engage the adjacent side-walls and lower corner edges of the hole to effectively retain the clip device in applied position on the support. If desired the leg members may be so designed that the hooks 16, 17 of a clip are disposed in the hole by a simple insertion without the necessity for compressing the leg members toward each other. In any event when a clip is seated in applied position on a support, the tube or other object O, to be held is brought to the outwardly flared extremities 14, 15, Fig. 5, and pressed thereagainst; as the object is advanced in the clip the leg members naturally will be forced apart to spread and permit the object to enter the grippling portions 18, 19, whereupon the legs are tensioned and the object is rigidly retained in mounted position in spaced relation to the support as shown in Fig. 6. The application of the object between the leg members serves not only to spread the same to permit seating of the object in the gripping portions 18, 19 but also effects a diverging movement of the hook elements 16, 17 to position the same in locking engagement with the support. This locking engagement naturally is maintained at all times due to the tensioned relation of the legs 10, 11 as effected by the spreading thereof by the object on being applied to the gripping portions 18, 19. In this relation it is to be noted that the rigidity of the mounting is enhanced by the use of elongated base portions 12a, 13a, which insure a firm seating of the clip on the support and a rigid mounting of the object at all times.

Figs. 7 and 8 show a modified construction which is substantially similar in operation and use to the embodiment described with reference to Figs. 1–6 inclusive. In this form of clip device, the extremities 24, 25 of the body portions are formed inwardly toward each other to provide a constricted throat which permits application of the object to the leg holding members of the clip but serves to lock the object in applied mounted position therein against reverse movement as shown in Fig. 8. Due to the positive locking action thus provided by the inturned extremities of the body portions, the leg members 20, 21 need not be provided with preformed depressions to seat the object in applied position. The object on being applied to the substantially flat leg members Fig. 7, causes a natural deformation of the leg members depending on the contour of the object. This arrangement naturally provides for a greater tensioning effect in the leg members thereby providing a most effective gripping engagement thereof with the object in mounted position. In this form of the device, by virtue of the substantially flat leg members the hook elements 26, 27 may be disposed at substantial right angles thereto, to be urged to positive locking engagement in the hole and with the adjacent underface of the support, Fig. 6, on movement thereof about their points of suspension upon application of the object to be mounted.

Figs. 9–11 inclusive show a modified construction of the clip wherein one leg member only is yieldably suspended from the body portions to be moved to locking relation in an aperture on a support upon application of the object to be mounted. This form of clip may be constructed from a blank such as represented in Fig. 9 which is slit along the lines indicated to provide the body portions 30 and 33, the portion 37 comprising a relatively short leg member forming one hook element, and the leg member 31 which is suspended from the body portions in the area of the extremity 38. The blank when thus slit is formed substantially as shown in Figs. 10 and 11 with the body portions 33 presenting loops or yokes each comprising a relatively wide, flat base 34 and spring body portion 35, from which is suspended the locking leg member 31. The extremity of the leg member 31 is formed to provide a locking hook 36 which cooperates with the rigid hook provided from portion 37 depending from the body portion 30, to retain the clip in position on a support. The body portion 30 may be designed in any suitable manner but preferably is fashioned to the contour of the object to snugly embrace the same in mounted position. To apply this form of the clip to position on a support, the device need be only slightly canted to insert the rigid hook 37 in the hole and in engagement with the adjacent underface of the support whereupon the hook 36, carried by the leg member 31, may freely pass into the aperture in the support with the flat base portion 34 seated flush with the upper surface thereof as shown in Fig. 10. Then, upon application of an object to a clip so positioned, the yieldable leg member 31 is caused to be moved from its normal, untensioned relation to tensioned engagement in the aperture with the hook 36 carried thereby disposed in overlying relation with the surfaces of the support adjacent the aperture and cooperating with the similarly disposed, relatively rigid hook 36 in maintaining the clip device in locked relation on the support with the body portion 30 and leg holding member 31 in firm, rigid, gripping engagement with the object.

The invention has been described with particular reference to the use in mounting gasoline lines, cables, and the like, of automobiles; however it is to be appreciated that the clip may be used for mounting tube lines, rods or any other object in any desired installation, although it is apparent that it is admirably suited for the purpose of mounting tube lines on automobile chassis. In this connection, the clip is not only desirable and advantageous from the standpoint of cheapness of manufacture, the facility with which it may be mounted, but also the manner in which the tube is held spaced from the support to prevent dangerous wear, rattles, and other objectionable noises. The clip itself engages the support or frame in locked relation under spring tension; it likewise embraces the tube or other object with tension, and since obviously there is nothing to come loose, as there are no bolts or nuts, a tight locked mounting will be maintained over an indefinite period.

While this invention has been described in detail with specific examples such examples are illustrative only, since other modifications within the spirit and scope of the invention will be apparent to those skilled in the art. Hence the invention is to be understood as limited only as indicated in the appended claim in which the intent is to set forth all the novelty over the prior art.

What is claimed is:

A clip for mounting a cable or the like onto an apertured support, said clip comprising a section of sheet metal having a bend on either end of the substantial mid-portion thereof to provide a substantially flat base and a pair of body portions extending from each end of the substantially flat base in the same general direction above said base, a yieldable leg member depending from one of said body portions and extending between said body portions to a point below said base, said yieldable leg member terminating in an outwardly projecting locking hook extending below said base, said clip also having a cooperating substantially rigid hook extending below said base and projecting in generally opposed relation to said locking hook on the yieldable leg member.

HERMAN G. LOMBARD.